United States Patent
Colwill, Jr.

(10) Patent No.: US 7,149,743 B2
(45) Date of Patent: Dec. 12, 2006

(54) VIRTUAL DIRECTORY

(75) Inventor: Ronald W. Colwill, Jr., Edmonds, WA (US)

(73) Assignee: Heck.Com, LLC, Thousand Oaks, CA (US)

(*) Notice: Subject to any disclaimer, the term of this patent is extended or adjusted under 35 U.S.C. 154(b) by 634 days.

(21) Appl. No.: 09/781,901

(22) Filed: Feb. 9, 2001

(65) Prior Publication Data

US 2002/0112028 A1    Aug. 15, 2002

Related U.S. Application Data

(60) Provisional application No. 60/249,515, filed on Nov. 17, 2000.

(51) Int. Cl.
*G06F 17/30* (2006.01)

(52) U.S. Cl. ............... 707/102; 707/100; 707/101; 707/103 R; 707/104.1

(58) Field of Classification Search ............... 707/2, 707/100, 101, 102, 103 R, 104.1; 715/700
See application file for complete search history.

(56) References Cited

U.S. PATENT DOCUMENTS

| | | | |
|---|---|---|---|
| 5,778,367 A | 7/1998 | Wesinger, Jr. et al. | |
| 5,850,433 A | 12/1998 | Rondeau | |
| 5,864,871 A * | 1/1999 | Kitain et al. ............. | 707/104.1 |
| 5,940,821 A | 8/1999 | Wical | |
| 6,009,459 A | 12/1999 | Belfiore et al. | |
| 6,038,560 A | 3/2000 | Wical | |
| 6,069,890 A * | 5/2000 | White et al. ............. | 370/352 |
| 6,078,866 A | 6/2000 | Buck et al. | |
| 6,081,900 A * | 6/2000 | Subramaniam et al. ....... | 726/19 |
| 6,085,188 A | 7/2000 | Bachmann et al. | |
| 6,098,065 A | 8/2000 | Skillen et al. | |
| 6,587,127 B1 * | 7/2003 | Leeke et al. ............. | 715/765 |
| 6,788,769 B1 * | 9/2004 | Waites ................... | 379/93.24 |
| 6,938,051 B1 * | 8/2005 | Burger et al. ............ | 707/104.1 |
| 2002/0091836 A1 * | 7/2002 | Moetteli ................. | 709/227 |
| 2002/0103789 A1 * | 8/2002 | Turnbull et al. .......... | 707/3 |
| 2002/0112028 A1 * | 8/2002 | Colwill, Jr. ............. | 709/218 |

OTHER PUBLICATIONS http://superpages.com/, (Feb. 2, 2001).

(Continued)

*Primary Examiner*—Frantz Coby
(74) *Attorney, Agent, or Firm*—Morgan & Finnegan, L.L.P.

(57) ABSTRACT

A method, system and apparatus for providing a virtual directory to facilitate a quick, direct search for a web site on the Internet. A user is provided with an extensive number of first level search categories. By clicking on a first level search category, the user is linked to a plurality of corresponding second level search categories which are pre-selected by a service provider. By clicking on a second level search category, the user is linked to a plurality of corresponding third level search categories, which are also pre-selected by the service provider. The third level search categories are preferably URLs corresponding to the search. The user can click on any one of the URLs to access a web site. A button is provided on a bar of the web site by which a user can return to one of the first or second level search categories directly from the current web page bypassing all the intermediate web pages the user reviewed. The virtual directory also provides a search engine directory whereby a user can switch from one search engine to another in order to complete a search without having to retype a search category.

132 Claims, 11 Drawing Sheets
(9 of 11 Drawing Sheet(s) Filed in Color)

OTHER PUBLICATIONS http://www.buyersindex.com/, (Feb. 2, 2001).
www.pcindex.co.uk, (Feb. 1, 2001).
www.WebBound.com, (Feb. 6, 2001).
wwwAbout.com, (Dec. 18, 2000).
www.Altavista.com, (Nov. 9, 2000).
www.AOL.com, (Jan. 24, 2001).
www.Cannylink.com, (Feb. 2, 2001).
www.Directhit.com, (Dec. 3, 2000).
www.Dogpile.com, (Jan. 30, 2001).
www.Excite.com, (Jan. 7, 2001).
www.Finit.com, (Feb. 3, 2001).
www.Findwhat.com, (Feb. 4, 2001).
www.Go.com, (Jan. 7, 2001).
www.Google.com, (Feb. 1, 2001).
www.Goto.com, (Dec. 6, 2000).
www.Gotoworld.com, (Oct. 19, 2000).
www.Go2net.com, (Nov. 20, 2000).
www.Hotbot.com, "Unavailable".
www.Infospace.com, (Jan. 7, 2001).
www.Jayde.com, (Feb. 2, 2001).
www.Looksmart.com, (Oct. 19, 2000).
www.Lycos.com, (Jan. 19, 2001).
www.MicrosoftNetwork.com, (Aug. 16, 2000).
www.NBCi.com, (Aug. 15, 2000).
www.Netscape.com, (Dec. 4, 2000).
www.Questfinder.com, (Dec. 7, 2000).
www.Search.com, (Jan. 18, 2001).
www.Sprinks.com, (Feb. 3, 2001).
www.Top10links.com, (Jan. 5, 2001).
www.Yahoo.com, (Jan. 24, 2001).
www.WebBound.com, duplicate (listed in previous p. 1).
www.Webcrawler.com, (Jan. 18, 2001).
www.Web-search.com, (Feb. 2, 2001).
Clark, David, "Search Engine Surge", IEEE Software v. 16 no4 (Jul./Aug. 1999) p. 112, IEEE Soft, ISSN:0740-7459.
Notess, Greg R., "New Databases From The Internet Search Services", Database (Weston, Conn.) v. 20 (Apr./May '97) p. 72-4 Journal Code: Database, ISSN:0162-4105.
Duen-Ren Liu, Shien-Chang Pan, Database and Expert Systems Applications, 1999. Proceedings. Tenth International Workshop on, 1999, pp. 630-634, ISBN: 0-7695-0281-4.
Communication for "International Search Report" dated Apr. 27, 2001, PCT/US01/04255.

* cited by examiner

| | | | | | |
|---|---|---|---|---|---|
| A | B | C | Babies | Batteries | Board Games |
| D | E | F | Backpacking | Beaches | Bodybuilding |
| | | | Bail Bonds | Bed & | Books |
| G | H | I | Baking | Breakfast | Botany |
| J | K | L | Ballet | Bedding | Bowling |
| | | | Bankruptcy | Beer | Boxing |
| M | N | O | Banks | Beverages | Brand Names |
| P | Q | R | Bar Association | Bicycles | Bread |
| | | | Barbeque | Billiards | |
| S | T | U | Bartending | Biology | Bridges |
| V | W | X | Barter Services | Birds | Broadcasting |
| | | | Baseball | Blindness | Buses |
| Y | Z | | Basketball | Blood Banks | Business |

FIG. 5

VIRTUAL DIRECTORY

CROSS-REFERENCE TO RELATED APPLICATION

This application claims priority from provisional U.S. Patent Application Ser. No. 60/249,515 entitled VIRTUAL DIRECTORY filed on Nov. 17, 2000, the entirety of which is incorporated by reference herein.

FIELD

A method, system and apparatus for providing a virtual directory for the world wide web ("Internet") and, more specifically, a method, system and apparatus for providing an improved virtual directory searching system for consumer to business or business to business electronic commerce.

BACKGROUND

In recent years, the Internet has been transformed from a virtual unknown, used by only a select group of college professors and government researchers, to a virtual universe with over 120 million people visiting regularly from the U.S. alone. The number of users will continue to grow rapidly as home computers become more affordable and high speed Internet access becomes more available. As the number of users increase, so will the number of web sites. Jupiter Communication reported approximately 2 billion web pages at the beginning of 2000 and projects the number to exceed 16 billion within 4 years. The good news is that never before have businesses and consumers had such tremendous access to information. The bad news is that finding the right information among the billions of web sites has become much more difficult and time consuming. The plethora of information now available on the Internet can make even a simple search complicated.

Multiple search engines and portal directories such as yahoo.com, altavista.com or google.com, have come on-line in recent years to assist Internet users in finding web sites. The machine assembled search engines available today are very expansive and often retrieve a tremendous amount of information. They retrieve pages on the web by matching words in the pages from broad databases of text available on the world wide web. A "crawler" enters a web site and thoroughly indexes the page contents. The frequencies and proximity of significant words are tallied and form the basis of the order of display in search results from the engine. A simple search on one of these engines can produce over hundreds, if not, thousands of results. Often the results are irrelevant and a waste of time. Search engines generally display only about 10 items of the entire results per page. This is commonly referred to as "first page results". Most often several sites listed among the first page results are not even relevant to the topic entered. Moreover, it is not uncommon for the same site to be listed multiple times on the same page, or for a site to contain offensive material. This can be a frustrating experience for the typical user.

What differentiates a search engine from a directory is simple human intervention. Directories, whether they are organized by subject categories or databases, are searchable, browsable and assembled by humans. Available directories have the same characteristics: a search bar to type in a desired topic and a limited number of predetermined categories, usually on the order of 10 to 15, such as "sports", "shopping" or "entertainment" to browse within. In addition, most directories have very busy web pages. Usually surrounding the search bar and categories are flashing news headlines, stock quotes, horoscopes, weather and the ever present banner advertisements.

There are several stumbling blocks to a successful search using current directories. The obvious: how to fit the contents of the Internet into 10 to 15 categories. Browsing the categories often becomes a time consuming guessing game. Every web site on every topic contained within the directory is grouped into one of the 10 to 15 categories. The user commonly must guess which broad category applies to the topic of the search. An incorrect guess will cause the user to click on a pointing device, such as a mouse, numerous times more than necessary; or, even if the user guesses correctly, the user must click many times to further narrow the broad category. After the passage of a significant amount of time, it is not uncommon that a user may be twelve pages deep into a site and nowhere near the desired topic. Companies whose sites are listed in current directories must rely on the patience and intuition of web users if their sites are to be found.

The type and search format of existing search engines and directories are also cumbersome and do not lend easily to new wireless technology. Existing search engines and directories lack speed and it is often difficult to type in the text. Many of the existing directories are also "sticky." Such directories keep the user within the site, opening as many pages as possible, for as long as possible. There is a need for an Internet directory which provides easier access through scrolling and clicking through an extensive list of topics such that a user leaves the directory and reaches their destination as quickly as possible. There is also a need for a directory with stream-lined text to facilitate downloading.

Still another disadvantage of current search engines/portal directories arises when a user cannot complete a successful search in one search engine/portal directory and seeks to resume the search in another search engine/portal directory. Exiting one sticky directory can be complicated enough, while accessing another directory to resume a search can be even more time consuming. There is a need for an Internet search engine directory that facilitates transition from one search engine/portal directory to another in order to complete a search.

SUMMARY

The method, system and apparatus provides a virtual directory in which a simple interface guides a user to a desired web site in a limited number of clicks, preferably four or less, to obtain quick, direct results without the need for typing in any text.

In accordance with one embodiment, upon login, a simple first interface/screen showing all the available first level categories in one page is displayed to a user. Preferably, the first level categories are organized in alphabetical order for the convenience of the user. The available categories on the screen are pre-selected and up-loaded to the screen by a directory service provider. Each first level category is linked to a plurality of corresponding second level sub-categories. The plurality of second level sub-categories, also are pre-selected and up-loaded by the service provider, and each plurality of second level sub-categories is branched from a corresponding first level category. Each second level sub-category is linked to a plurality of corresponding third level sub-categories. The plurality of third level sub-categories, also are pre-selected and up-loaded by the service provider and each plurality of third level sub-categories is branched from a second level sub-category. While the number of link levels for sub-categories may vary depending on a search category, the third level of linking (third level sub-category) is preferable for most Internet searches.

A user browses the first level categories and points and clicks on the corresponding word (i.e., a category) on the screen. Alternatively, if the user does not find an appropriate category by scrolling up and down the page where the categories are listed, or the user does not want to scroll up and down the page, the user may preferably point and click on one of the letters of the alphabet shown on the screen along with the first level categories. The selected letter corresponds to the search category the user has in mind. Each letter of the alphabet is linked to a group of first level search categories pre-selected and up-loaded by a directory service provider. Preferably, the first letter of each category in the group corresponds to the letter of the alphabet selected. If the virtual directory does not have a category corresponding to the user's search, the user may be encouraged to send an e-mail to the service provider requesting that the missing category be included in the directory.

In response to the first click, a second screen is displayed showing a plurality of corresponding second level sub-categories. The user selects a second level sub-category by pointing and clicking on the corresponding word (i.e., a category) on the screen.

In response to the second click, the user is presented with a third screen which shows a plurality of corresponding third level sub-categories. If the third link level is sufficient for the search, the third level sub-categories comprise a plurality of URLs (Universal Resource Locators) linked to real web sites relating to the selected second level sub-category. The user selects one of the URLs by pointing and clicking on the corresponding URL on the screen. In response to the third click, the user has now logged onto a web site and can now browse the web site to access the information needed.

In another embodiment, while the user is browsing the web site, the user is provided with a link in any form, preferably a bar, button or icon, by which the user can return to one of the previous sub-categories directly with a single click bypassing all the intermediate web pages the user reviewed in the web site.

In still another embodiment, a first interface displays at least 1,000 first level search categories in a single web page, wherein each of the first level search categories is configured such that a user can point and click on any category and link to a plurality of second level search categories. The user can browse the first level search categories using a scroll bar or alternatively by clicking on the letter of the alphabet corresponding to the search category of interest. After receiving the first click, a second interface is displayed which shows no more than 30 second level search categories corresponding to one of the first level search categories selected by the user, wherein each of the second level search categories is configured such that a user can point and click on any category and link to a plurality of third level search categories. After receiving the second click, a third interface is displayed to the user showing no more than 30 third level search categories corresponding to one of the second level search categories selected by the user. Each third level search category comprises a URL, such that upon pointing and clicking on a URL (the third click), a user is linked to an Internet web site.

In yet another embodiment, the virtual directory provides a search engine directory facilitating transition from one search engine to another. A user browsing the point and click directory can access the search engine directory at any time by clicking on a search button. At least one interface is displayed comprising a plurality of search engine categories, wherein search engine categories are configured so that a user can point and click on a category and link directly to a search engine web site. A user types in a search topic in a search field and clicks on a search engine category to link to a search engine web site. If the user is not satisfied with the results of the search in the search engine web site, the user can return directly to the search engine directory by clicking on a return button or icon. Without retyping the search topic, the user can click on another search engine category and link directly to another search engine web site to resume the search.

It is not intended that the method, system and apparatus for providing a virtual directory be summarized here in its entirety. Rather, further features, aspects and advantages of the virtual directory are set forth in or are apparent from the following brief description, detailed description, drawings and claims which follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further aspects of the method, system and apparatus for providing a virtual directory will be more readily appreciated upon review of the detailed description set forth below when taken in conjunction with the accompanying drawings, of which:

FIG. 5 is an embodiment of a first interface 400 displaying first level search categories corresponding to the letter "B" positioned on the screen by using the scroll bar;

FIG. 11 is an embodiment of a web page 1000 of a selected search engine, "Google", with a return bar, including a return button and a hide button.

It will be understood that the foregoing brief description and the following detailed description are exemplary and explanatory of the method, system and apparatus for providing a virtual directory, but are not intended to be restrictive thereof or limiting of the advantages which can be achieved by the virtual directory. Thus, the accompanying drawings, referred to herein and constituting a part hereof, illustrate embodiments of the virtual directory and, together with the detailed description, serve to explain the principles of the virtual directory.

DETAILED DESCRIPTION

Figure 1:
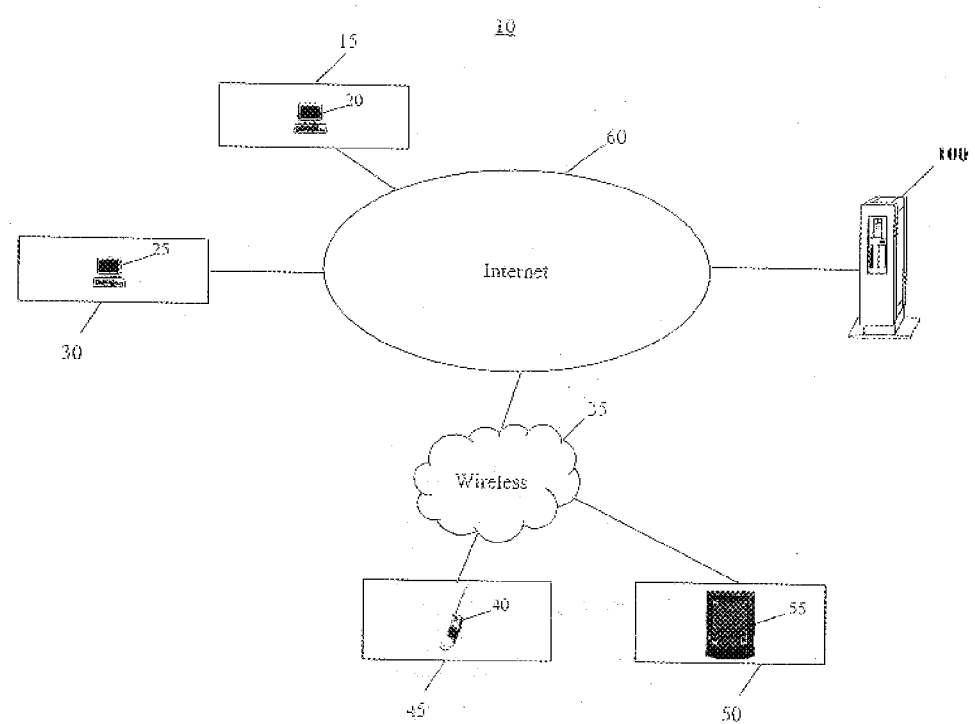
FIG. 1 is a network schematic of an embodiment of a virtual directory system 10.

FIG. 1 is a network schematic of an embodiment of a virtual directory system ("VDS") 10. VDS 10 is configured so that a user searching for a particular web site can be guided to the web site using a web browser in a limited number of clicks, preferably four or less, without the need for typing in any text. VDS 10 is suitable for the Internet, and more preferably for consumer to business or business to business electronic commerce. VDS 10 includes virtual directory host server 100 which is connected to Internet 60 through an Internet service provider (ISP). End users 15, 30, 45 and 50 are connected to Internet 60 through any type of computing device such as personal computers 20 and 25, a workstation, a network terminal, or via wireless communications 35 using any form of wireless or hand-held remote device, such as wireless telephone 40 or palm pilot 55, that can accomplish two-way electronic communication over the network.

Figure 2:
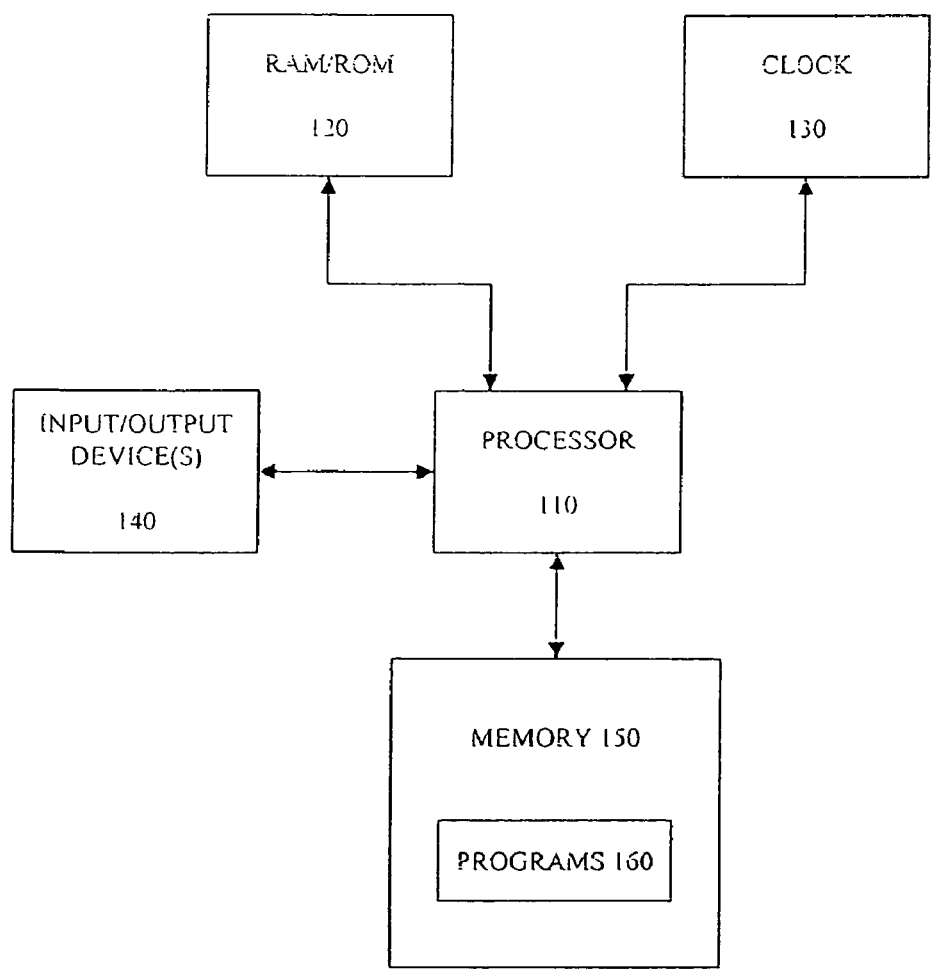
FIG. 2 is a block diagram of an embodiment of a virtual directory host server 100.

Turning now to FIG. 2, illustrated therein are exemplary components of a computer device, such as virtual directory host server 100. Any of user remote devices 20, 25, 40 or 55 may share a similar configuration. The primary component of virtual directory host server 100 is processor 110, which may be any commonly available microprocessor. Processor 110 may be operatively connected to further exemplary components, such as RAM/ROM 120, clock 130, input/output device(s) 140, and memory 150 which, in turn, stores one or more computer programs 160.

Processor 110 operates in conjunction with random access memory and read-only memory. The random-access memory (RAM) portion of RAM/ROM 120 may be a suitable number of Single In-Line Memory Module (SIMM) chips having a storage capacity (typically measured in kilobytes or megabytes) sufficient to store and transfer, inter alia, processing instructions utilized by processor 110 which may be received from application programs 160. The read-only memory (ROM) portion of RAM/ROM 120 may be any permanent non-rewritable memory medium capable of storing and transferring, inter alia, processing instructions performed by processor 110 during a start-up routine of virtual directory host server 100.

Clock 130 may be an on-board component of processor 1 10 which dictates a clock speed (typically measured in MHz) at which processor 110 performs and synchronizes, inter alia, communication between the internal components of virtual directory host server 100.

Input/output device(s) 140 may be one or more known devices used for receiving operator inputs, network data, and the like and transmitting outputs resulting therefrom. Accordingly, exemplary input devices may include a keyboard, a mouse, a voice recognition unit and the like for receiving operator inputs. Output devices may include any known devices used to present data to an operator of virtual directory host server 100 or to transmit data over computer network 10 to a remote user. Accordingly, suitable output devices may include a display, a printer and a voice synthesizer connected to a speaker.

Other input/output device(s) 140 may include a telephonic or network connection device, such as a telephone modem, a cable modem, a T-1 connection, a digital subscriber line or a network card, for communicating data to and from other computer devices over computer network 10, such as remote devices 20, 25, 40 and 55. Input/output device(s) 140 can have capacity to handle high bandwidth traffic in order to accommodate communications with a large number of users.

Memory 150 may be an internal or external large capacity device for storing computer processing instructions, computer-readable data, and the like. The storage capacity of memory 150 is typically measured in megabytes or gigabytes. Accordingly, memory 150 may be one or more of the following: a floppy disk in conjunction with a floppy disk drive, a hard disk drive, a CD-ROM disk and reader/writer, a DVD disk and reader/writer, a ZIP disk and a ZIP drive, and/or any other computer readable medium that may be encoded with processing instructions in a read-only or read-write format. Further functions of and available devices for memory 150 will be apparent.

Memory 150 may store, inter alia, a plurality of programs 160 which may be any one or more of an operating system and one or more application programs, such as a directory service provider program. Programs 160 may include processing instructions for accomplishing a virtual directory system as described herein.

Virtual directory host server 100 can be configured to include any number of websites in memory 150 as well as any number of search categories. For example, the virtual directory can coordinate as many as 500,000 sites into 1,400 categories. Virtual directory host server 100 can also be configured to list only the top web sites and to perform a "dead URL" search to ensure that the sites listed are active, and can be continually updated with the most current and popular sites for each category.

The virtual directory process may begin after a user at remote device 20, 25, 40 or 55 selects the URL of virtual directory host server 100. The URL for virtual directory host server 100 may be entered into the URL entry field of the browser residing on the user's remote device. An exemplary sign-in window may then be presented on the display screen of the user's device including a sign-in field requiring, for example, a user name or other unique identifier. Upon entering the field information, the user may transmit such information to virtual directory host server 100 with a pointing and clicking device, such as a mouse. Alternatively, the home page of the virtual directory site may display the first interface of first level search categories.

In accordance with an embodiment, upon visiting the virtual directory host server 100 site, a first interface/screen displaying all the available first level categories in one page is presented to a user. Preferably, the first level categories can be at least 1000 items organized in, e.g., alphabetical order, for the convenience of the user. The available categories on the screen are pre-selected and up-loaded to the screen by a directory service provider. Each first level category is linked to a plurality of corresponding second level search categories. Preferably, the second level search categories are no more than 30 items branched from a corresponding first level category. The second level search categories are pre-selected and up-loaded by the service provider as the second level search categories. Each second level search category is linked to a plurality of corresponding third level search categories. Preferably, the third level search categories are no more than 30 items branched from a second level search category. The third level search categories are also pre-selected and up-loaded by the service provider as the third level search categories. While the number of link levels for search categories may vary depending on a search category, the third level of linking (third level search category) is preferable for most Internet searches.

The virtual directory is preferably configured to use hyperlinks. Simple underlining and or highlighted words are preferably employed to take a user to a desired destination when clicked.

A user selects one of the first level categories by pointing and clicking on the corresponding word (i.e., a category) on the screen. Alternatively, if the user does not find an appropriate category by first scrolling up and down the page where the categories are listed, or the user does not want to scroll up and down the page, the user may preferably click on one of the letters of the alphabet shown on a portion of the screen along with the first level categories. The selected letter corresponds to a search category the user has in mind. Each letter of the alphabet is linked to a group of first level search categories pre-selected and up-loaded by a directory service provider. Preferably, the first letter of each category in the group corresponds to the letter of the alphabet selected. If the virtual directory does not have a category corresponding to the user's search, the user may be encouraged to send an e-mail to the service provider requesting that the missing category be included in the directory.

In response to the first click, the user is presented with a second screen which displays a plurality of corresponding second level search categories. The user selects a second level search category by pointing and clicking on the corresponding word (i.e., a category) on the screen.

In response to the second click, the user is presented with a third screen which displays a plurality of corresponding third level search categories. If the third link level is sufficient for the search, the third level search categories comprise a plurality of URLs linked to web sites corresponding to the selected second level search category. The user selects one of the URLs by pointing and clicking on a URL on the screen.

The user has now logged onto a web site. The user can now browse the web site to access the information needed. While the user is in the web site, the user is provided with a link presented on the display screen in any form, preferably a bar, button or icon, by which the user can return to the virtual directory site directly with one click bypassing all the intermediate web pages the user reviewed in the web site.

The virtual directory system is preferably navigated using a point and click device, such as mouse. In the preferred embodiment, a user need only click and or scroll to reach a destination and does not have to type any text relating to a search. The directory is particularly useful for wireless and hand-held devices where typing in text can be cumbersome. The directory provides quick, direct results by simply requiring a user to click and or scroll to reach a desired web site. Preferably, the user reaches their destination in four clicks or less. The directory can be utilized for any search in a consumer-to-business e-commerce environment, business-to-business e-commerce environment or in any search undertaken on the Internet.

Figure 3:
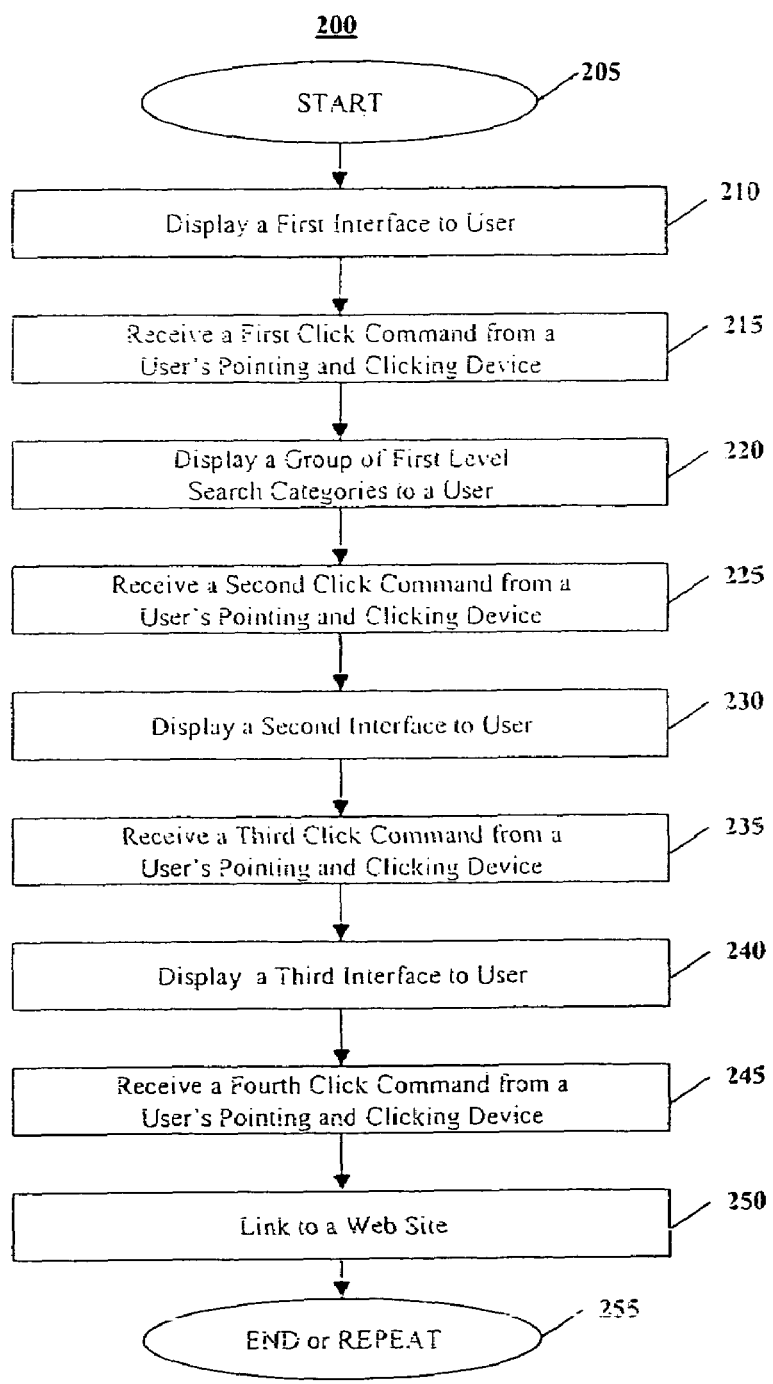
FIG. 3 is a flow chart 200 illustrating an embodiment of the process by which the virtual directory system guides a user to an Internet web site.

The virtual directory is now described in further detail referring to flow chart FIG. 3 in connection with FIGS. 4 to 8. The virtual directory system starts 205 when, in step 210 of FIG. 3, virtual directory host server 100 displays to a user a first interface of first level search categories.

Figure 4:
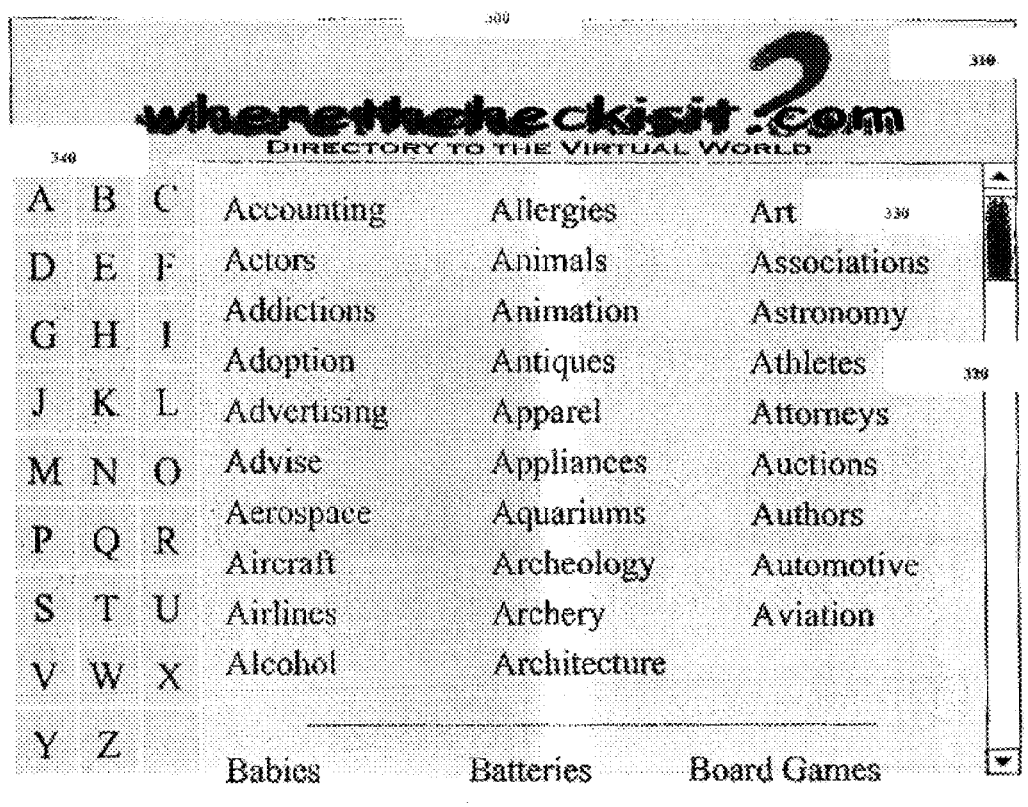
FIG. 4 is an embodiment of a first interface 300 displaying first level search categories corresponding to the letter "A" and also displaying the alphabet on the left margin of the screen and a scroll bar on the right margin of the screen.

FIG. 4 is an example of a first interface screen 300 presented to a user upon visiting the web site of virtual directory host server 100. Header portion 310 of first interface 300 shows a name of a service provider "WhereTheHeckIsIt?com" of virtual directory host server 100. Main content portion 320 of first interface 300 shows all the available first level search categories in one page. The first level categories are organized in alphabetical order for convenience of the user. While the initial screen of first interface 300 shows only a portion of the first level categories starting with the letter "A" and the first line of the first level categories starting with the letter "B", the page is configured to scroll up and down by scroll bar 330 to view the rest of the categories.

The left portion 340 of first interface 300 sets forth the alphabet, i.e., letters A–Z. Each letter of the alphabet is configured to link to a corresponding group of first level categories. Instead of clicking on scroll bar 330 to scroll up and down to find a particular category, a user may click on an alphabet letter on portion 340 to directly go to a group of first level search categories corresponding to the clicked alphabet letter. Using the alphabet, the virtual directory can allow users twenty-six options A through Z. The user chooses the letter that best fits the search. This intuitive step assists the user to enter the directory at the correct point. Portion 340 of first interface 300 remains fixed on the page if a user chooses to scroll up and down the page using scroll bar 330.

First interface 300 usually shows a plurality of search categories, i.e., preferably at least 1,000 search categories, enabling the user to select a search item as accurately as possible from the beginning of the search. The available categories on the screen are pre-selected and up-loaded by the directory service provider. A user may also participate in selecting or adding to the search categories. For example, if the virtual directory does not have a category corresponding to a user's search category, the user may be prompted to send an e-mail to the service provider requesting that the missing category be included. The number and type of categories may be varied and selected based on a variety of information, such as targeted users.

By way of example, a user may want to search the Internet for the types of special features offered by various manufacturers of "barbecue grills." As shown in FIG. 5, the user can search for the category "barbecue" by scrolling down main content portion 420 displaying first level search categories arranged in alphabetical order. By pointing and clicking on scroll bar 430 (the "first click"), the user can scroll to the group of first level search categories 420 beginning with the letter "B", which includes the category "barbecue". Again, header portion 410 of first interface 400 shows a name of a service provider "WhereTheHeckIsIt-?com" of virtual directory host server 100, and alphabet portion 440 appears in the left margin of second interface 400.

Alternatively, if the user does not find the appropriate first level category by scrolling up and down the page or the user prefers not to use the scroll bar, the user may point and simply click on the Alphabetical list shown on the first page. In this embodiment, the user is searching for the category "barbecue", so the user clicks on the letter "B" (the "first click") to arrive at the group of first level search categories 420 beginning with the letter "B" as shown in FIG. 5.

At step 215 of FIG. 3, the virtual directory host server receives a first click command from the user and displays a group of first level search categories to the user in step 220. At step 225, the virtual directory host server receives a second click command from the user, and recognizes that the user clicked on the search category "barbecue". At step 225, upon receiving the second click command, the virtual directory host server 100 displays to the user a second interface comprising a plurality of second level search categories in step 230. The second level search categories correspond to the selected first level search category and, preferably, there are no more than 30 second level categories in number. The second level search categories are pre-selected by the service provider as corresponding to the selected first level category. By selecting the categories, the search can be controlled and guided by the service provider. Each of the second level search categories is linked to a group of third level search categories.

Figure 6:
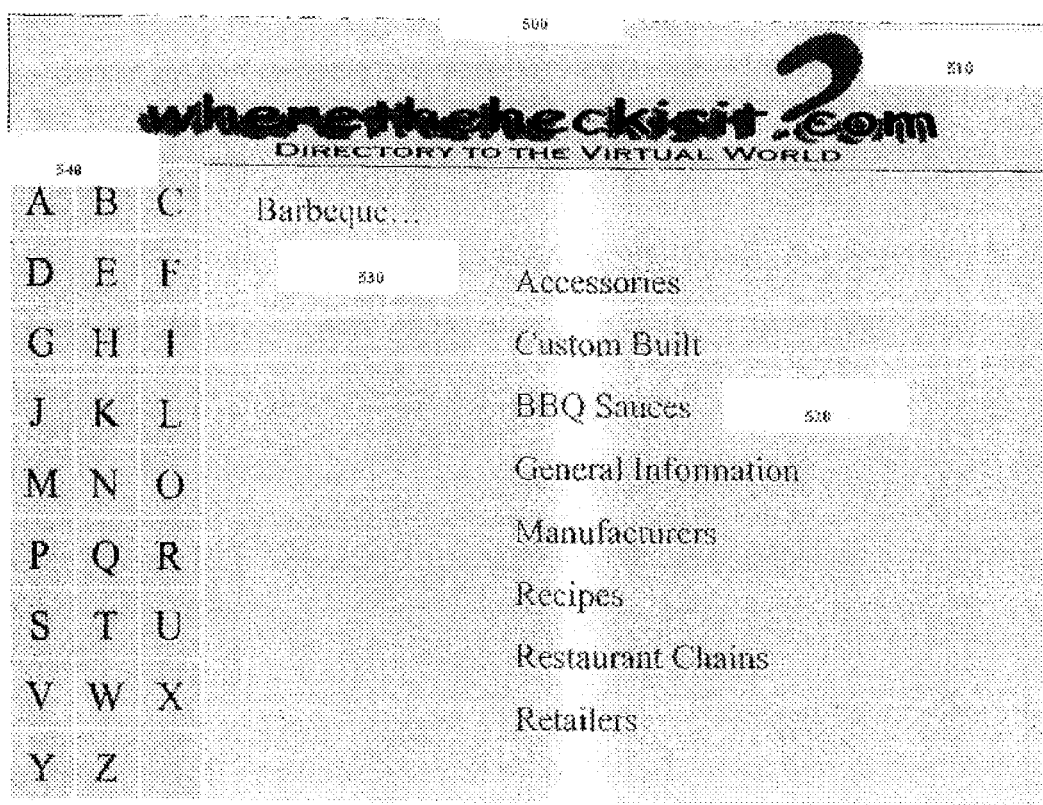
FIG. 6 is an embodiment a second interface 500 displaying second level search categories.

FIG. 6 is an example of a second interface screen 500 comprising a plurality of second level search categories 520. Second interface 500 in this example includes header 510 indicating the name of service provider "WhereTheHeckIsIt?com" and alphabet portion 540 by which the user may directly access another group of first level search categories. Top portion 530 of main content portion 520 displays a first level search category, i.e., "Barbecue . . . ", that was selected by the user resulting in the display of second interface 500. Main content portion 520 comprises a plurality of categories corresponding to the first level search category "barbecue". In this example, the service provider selected eight second level search categories: "Accessories", "Custom Built", "BBQ Sauces", "General Information", "Manufacturers", "Recipes", "Restaurant Chains" and "Retailers". Again, the user may be prompted to suggest additional categories. The suggested categories may be added based upon the service provider's discretion.

In this embodiment, the user clicks on "Manufacturers". In step 235 of FIG. 3, virtual directory host server 100 receives a third click command. In step 240, upon receiving the third click command, virtual directory host server 100 displays to the user a third interface comprising a plurality of third level search categories. The third level search categories are preferably a list of URLs related to the selected second level search category. Preferably, the third level search categories comprise the top 10, 20 or 30 URLs corresponding to a particular search. The URLs are selected by the service provider as corresponding to the selected second level search category. By selecting the URLs, the search can be controlled and guided by the service provider, such that a user is directed to quality web sites corresponding to the search category. Each of the third level search categories is linked to an Internet web site.

Figure 7:
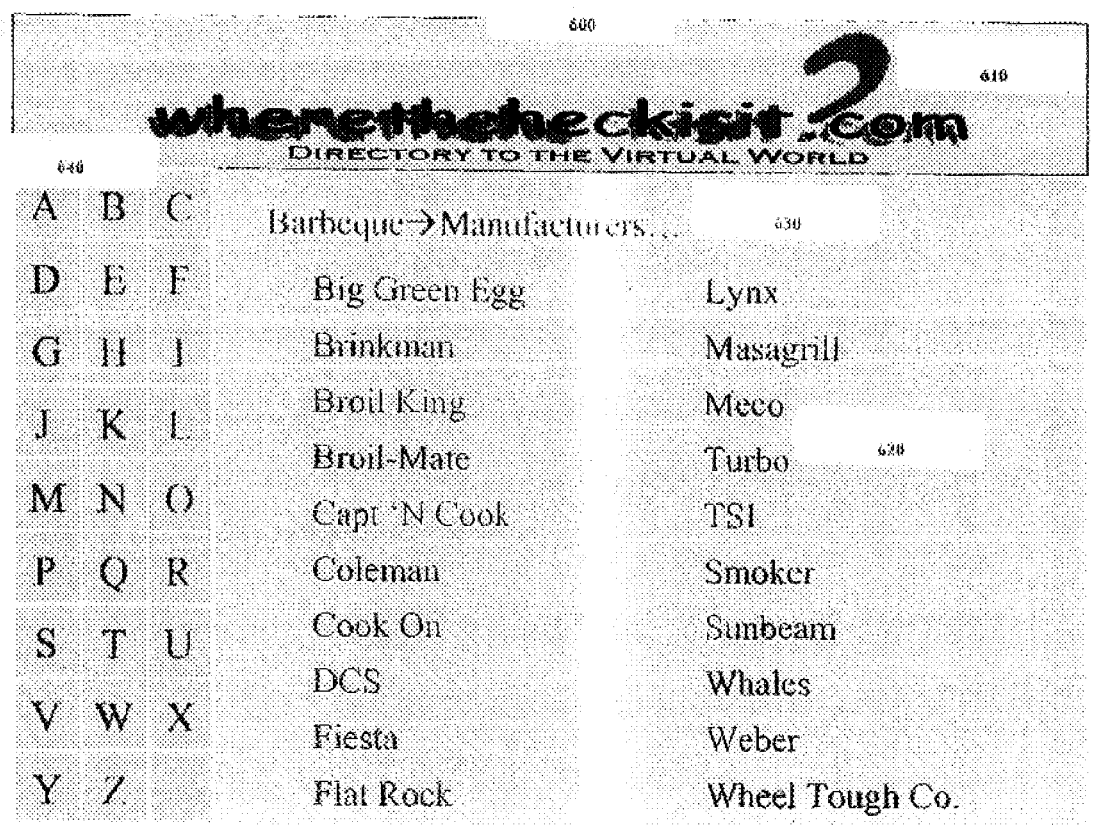
FIG. 7 is an embodiment of a third interface 600 displaying third level search categories.

FIG. 7 is an example of a third interface screen 600 comprising a plurality of third level search categories. Third interface 600 in this example includes header 610 indicating the name of service provider "WhereTheHeckIsIt?com" and alphabet portion 640 by which the user may directly access another group of first level search categories. Top portion 630 of main content portion 620 displays a search path, i.e. "Barbecue→ "Manufacturers . . . ", by which the user arrived at third interface 600. Main content portion 620 displays a list of barbecue manufacturers (URLs) relating to second level search category "Manufacturers" and the first level search category "Barbecue". The service provider in this example selected twenty (20) of the most popular barbecue manufacturers: "Big Green Egg", "Brinkman", "Broil King", "Broil-Mate", "Capt 'N Cook", "Coleman", "Cook On", "DCS", "Fiesta", "Flat Rock", "Lynx", "Masagrill", "Meco", "Turbo", "TSI", "Smoker", "Sunbeam", "Whales", "Weber" and "Wheel Tough Co.". The listed names of manufacturers are configured to point and click on to link to an Internet web site of a selected manufacturer.

Upon deciding to visit the web site of "Weber", for example, the user points and clicks on the name "Weber" displayed in third interface 600. In step 245 of FIG. 3, virtual directory host server 100 receives a fourth click command corresponding to the selected third level search category of third interface 600. In step 250, upon receiving the third click command, virtual directory host server 100 links to the web site selected by the user and displays the home page of the web site. The user has now logged onto the web site of "Weber." The user can now browse the web site of Weber and retrieve information responsive to the search thereby ending the search or repeating the search process (Step 255 of FIG. 3) for a different barbecue manufacturer or search category.

Figure 8:
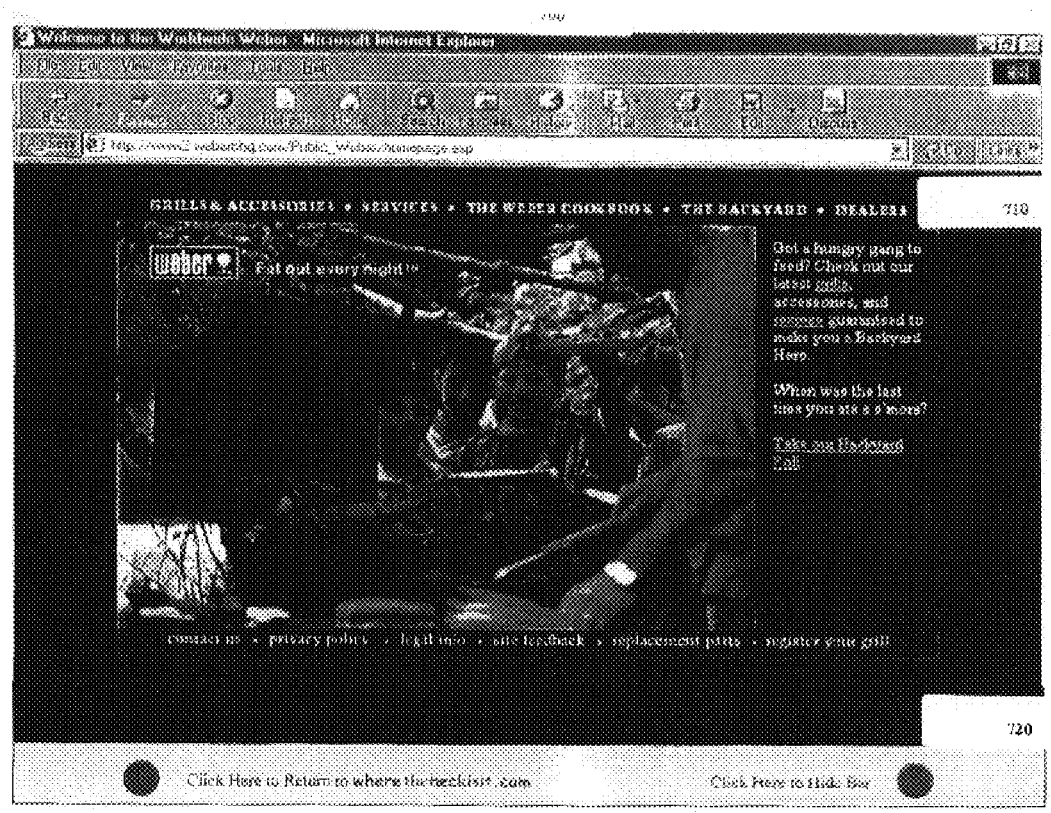
FIG. 8 is an embodiment of the home page 700 of a selected web site, "Weber", with a return bar, including a return button and a hide button.

FIG. 8 is an illustrative screen 700 of the home page of "Weber" 710. The lower portion of screen 700 comprises bar 720 including return button 730 captioned "Click Here to Return" to the service provider ("WhereTheHeckIsIt?com") and hide button 740 captioned "Click Here to Hide Bar". The clicks for both buttons are provided through a frame by the service provider for the virtual directory. Hide button 740 is configured to return the user back to the virtual directory, preferably to the first, second, third or any level of categories directly. Using the button, the user can return to the virtual directory with a single click regardless of how deep the user has browsed in a web site bypassing all of the intermediate web pages the user viewed in the web site. Hide button 740 is configured to hide bar 720, e.g., when a web page is printed so that it does not appear on the printed page. The return and hide buttons can be provided in any form.

The ability of the virtual directory to provide quick, direct results according to the foregoing embodiments is summarized below:

Click 1 Click on the letter "B" for barbecue.
Click 2 Next? Click on the word "Barbecue".
Click 3 Next? Click on the sub-topic "Manufacturers".
Click 4 Next? After just three clicks of the mouse, the user has arrived at a page full of links to barbecue manufacturers' web sites. The user is free to click on any link and browse back and fourth among the different companies.

As illustrated above, if a user wants to find out about barbecue manufacturers, in four clicks, the user can have access to the top twenty, without distracting and irrelevant direction to unrelated web sites. By clicking on the selected manufacturer, the user can gain direct access to the manufacturer's web site and can move to another manufacturer in as little as two clicks.

The virtual directory does not simply direct a user to the search results. It can get a user back to the directory just as quickly and directly. The virtual directory avoids the limitations of prior art search engines and portal directories where a user could get lost many pages deep in an irrelevant web site and have difficulty getting back to the starting point of a search, or get trapped in a web site that refuses to let the user leave until the user is essentially forced to type in a new URL number. The virtual directory removes these limitations by providing a link back to the virtual directory, in the form of a bar, icon, button or other mark, that can always be visible while the user browses the various web sites. In the case of the barbecue manufacturers, anytime the user wants to return to the directory listing the 20 manufacturers (no matter how many clicks deep the user has gone in a web site), the user simply clicks on the return button once and is immediately taken back to the virtual directory.

In another embodiment, the virtual directory can be utilized to facilitate transition from one search engine to another. For example, a user may not be able to find a search category corresponding to a search topic using the point and click directory described above. In such an instance, the virtual directory enables a user to search for the particular search category in any number of search engines or portal directories without having to retype the search category. Furthermore, in the event a search cannot be completed in a particular search engine site, a user can directly return to the virtual directory from the search engine site so that the user can switch to another search engine site just as quickly and directly until the search is completed.

Figure 9:
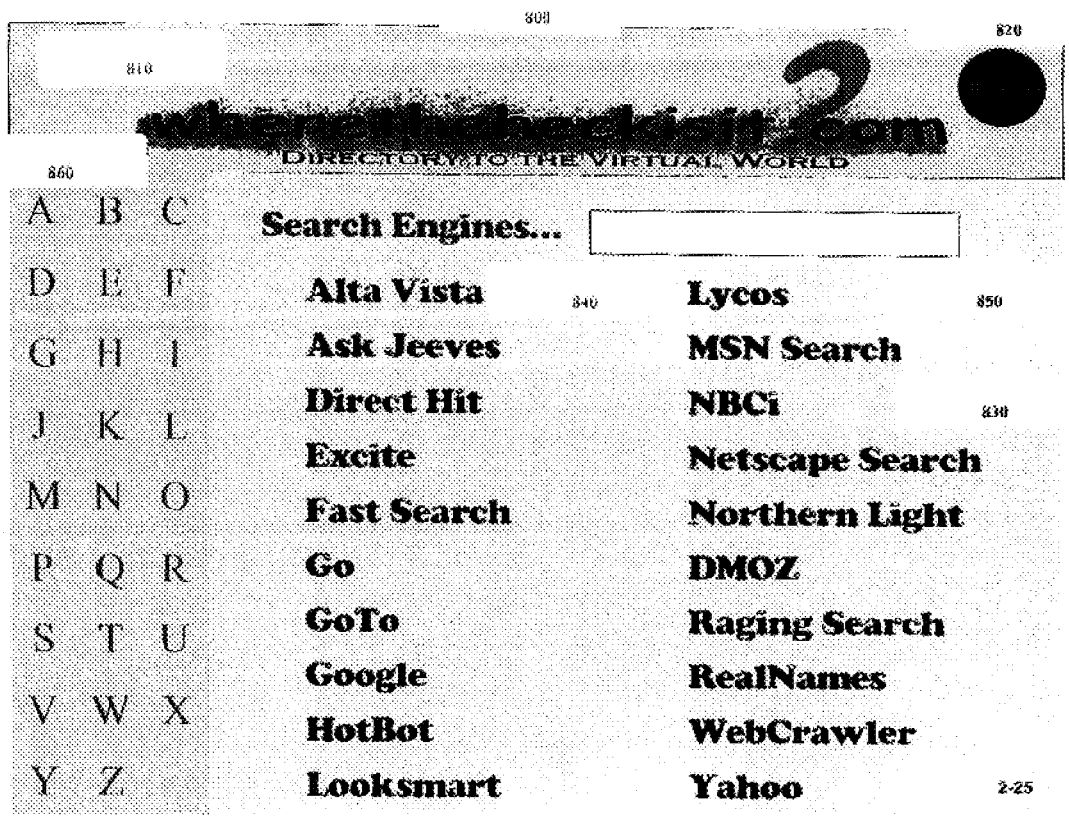
FIG. 9 is an embodiment of a search engine directory 800 displaying a plurality of search engine categories listed in alphabetical order and also displaying a search button at the top right portion of the screen, the alphabet on the left margin of the screen and a text field above the search engine list.

Referring to FIG. 9, interface screen 800 displays a plurality of search engine categories, i.e., a search engine directory. Interface screen 800 includes header 810 indicating the name of service provider "WhereTheHeckIsIt?com.", including search button or icon 820. Main content portion 830 includes a plurality of search engine categories arranged in alphabetical order. The top portion of main content portion includes a search category "Search Engines . . . " 840 and text field 850 for typing in a search topic. Alphabet portion 860 appears on the left margin of interface screen 800.

In this embodiment, a user could not find the search topic "Mononucleosis" in the point and click virtual directory described above. The user accesses the search engine directory by clicking on search button 820 or by clicking on the search category "Search Engines" found in the virtual directory. The search category "Search Engines" can be found in the directory using a scroll bar and scrolling down the list of search categories or by clicking on the letter "S" on the alphabet portion—the search category "Search Engines" is listed in the group of search categories corresponding to the letter "S".

In this embodiment, the search engine directory includes the following search engines categories (URLs) arranged in alphabetical order: "Alta Vista", "Ask Jeeves", "Direct Hit", "Excite", "Fast Search", "Go", "GoTo", "Google", "HotBot", "Looksmart", "Lycos", "MSN Search", "NBCi", "Netscape Search", "Northern Light", "DMOZ", "Raging Search", "RealNames", "WebCrawler" and "Yahoo". Any number of search engine categories arranged in any manner and in any number of interfaces (link levels) are suitable for the search engine directory. For example, search engine categories relating to the topic "medical" can be arranged such that a user (i) clicks on the letter "M" of alphabet portion, (ii) clicks on the topic "medical" among the group of search engine categories corresponding to the letter "M" and (iii) clicks on one of the search engine categories (URLs) corresponding to the search engine category "Medical".

Figure 10:
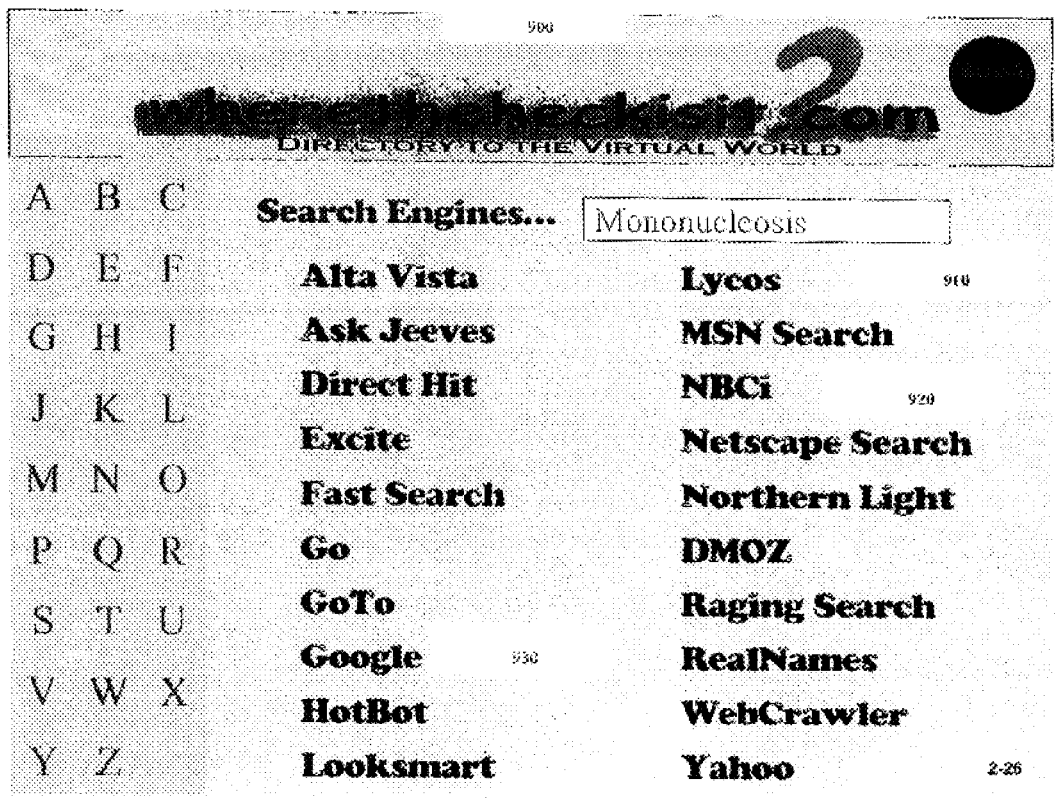
FIG. 10 is an embodiment of a search engine directory 900 with a search topic "Mononucleosis" typed in the text field.
Figure 13:
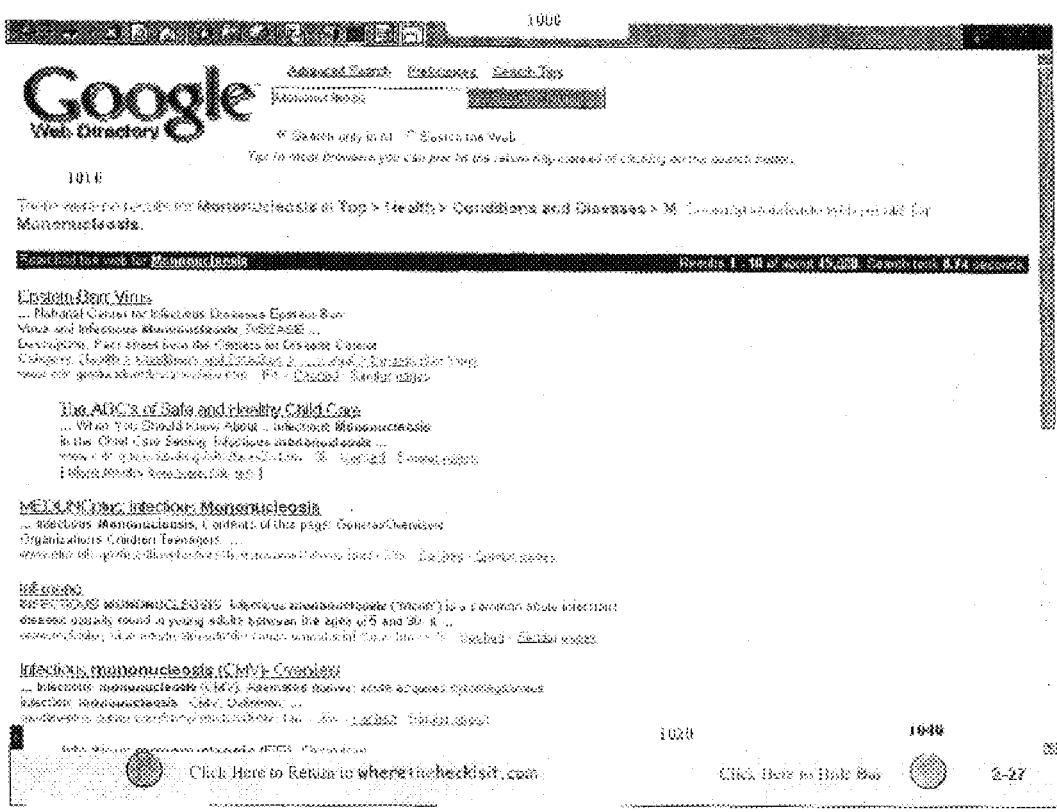

Referring to FIG. 10, a user typed in the search topic "Mononucleosis" in text field 910 of interface screen 900. By clicking on any of search engine categories (URLs) 920, the user searches for the topic "Mononucleosis" in the selected search engine category (URL). In this embodiment, the user selects search engine category "Google" 930.

FIG. 11 displays an illustrative screen 1000 of a web page from the web directory Google. The page displays the results corresponding to search topic "Mononucleosis" 1010. The lower portion of screen 1000 comprises bar 1020 including return button 1030 captioned "Click Here to Return" to the service provider ("WhereTheHeckIsIt?com") and hide button 1040 captioned "Click Here To Hide Bar". The clicks for both buttons are provided through a frame by the service provider for the virtual directory. The "Click Here To Return" button is configured to return the user back to the virtual directory, preferably to the search engine directory. Using the button, the user can return to the search engine directory in a single click regardless of how deep the user has browsed in a search engine site bypassing all of the intermediate web pages the user viewed in the web site. In this manner, if a user visiting the Google site cannot find the results for the search topic "Mononucleosis", the user can directly access the search engine directory by clicking on return button 1030 in order to switch to another search engine. The user simply clicks on another search engine category, i.e., Yahoo, to search for the topic "Mononucleosis". The user does not have to retype the topic "Mononucleosis". Hide button 1040 is configured to hide bar 1020. The return and hide buttons can be provided in any form.

Although illustrative embodiments have been described herein in detail, it should be noted and understood that the descriptions have been provided for purposes of illustration only and that other variations both in form and detail can be made thereupon without departing from the spirit and scope of the method, system and apparatus for providing a virtual directory. The terms and expressions have been used as terms of description and not terms of limitation. There is no limitation to use the terms or expressions to exclude any equivalents of features shown and described or portions thereof and the virtual directory should be defined with the claims that follow.

The invention claimed is:

1. A method for guiding a user through at least three interface levels of an internet virtual directory system to a desired internet web site relating to a search, comprising:
   (i) receiving a display of a first interface comprising, at least 1,000 first level search categories arranged in alphabetical order in a single web page, wherein each of said first level search categories is configured for pointing and clicking to link to no more than 30 second level search categories each which specifies a narrower subject matter subcategory related to a linked first level search category, alphabet letters A through Z arranged adjacent said first level search categories, and a scroll bar adjacent said first level search categories for navigating through said first level search categories;
   (ii) pointing and clicking on a first level search category;
   (iii) receiving a display of a second interface comprising a plurality of said second level search categories corresponding to said first level search category, wherein each of said second level search categories is configured for pointing and clicking to link to no more than 30 third level search categories;
   (iv) pointing and clicking on a second level search category;
   (v) receiving a display of a third interface comprising a plurality of said third level search categories corresponding to said second level search category, wherein each of said third level search categories is a uniform research locator configured for pointing and clicking to link to an internet web site;
   (vi) pointing and clicking on a third level search category; and
   (vii) receiving a display of a web page of said internet web site corresponding to said third level search category, wherein the categories in each of the first, second and third levels are pre-selected and uploaded by a service provider of the internet virtual directory system, and the categories of at least the second level are pre-selected based on the user's expected search results relating to the selected first level search category and uploaded by the service provider.

2. The method of claim 1, further comprising: (i) pointing and clicking on an alphabet letter; (ii) receiving a display of a group of said first level search categories corresponding to said alphabet letter; and (iii) pointing and clicking on a first level search category from said group of said first level search categories.

3. The method of claim 1, further comprising pointing and clicking on said scroll bar to locate a first level search category.

4. The method of claim 1, wherein said second interface comprises said alphabet letters arranged adjacent said second level search categories.

5. The method of claim 1, wherein said first level search category is displayed in said second interface adjacent said second level search categories.

6. The method of claim 1, wherein said third interface comprises said alphabet letters arranged adjacent said third level search categories.

7. The method of claim 1, wherein a search path is displayed in said third interface adjacent said third level search categories.

8. The method of claim 1, wherein a return bar is displayed adjacent said web page of said internet web site.

9. The method of claim 8, wherein said return bar comprises a return button or icon.

10. The method of claim 9, further comprising pointing and clicking on said return button or icon to return to said internet virtual directory system.

11. The method of claim 8, wherein said return bar includes a hide button or icon for hiding said return bar.

12. The method of claim 11, further comprising pointing and clicking on said hide button or icon to hide said return bar.

13. The method of claim 1, further comprising using a mouse to point and click through said internet virtual directory system.

14. A method for guiding a user through at least three interface levels of an internet virtual directory system to a desired internet web site relating to a search, comprising:
   (i) receiving a display of a first interface comprising, a plurality of first level search categories arranged in alphabetical order in a single web page, wherein each of said first level search categories is configured for pointing and clicking to link to at least one second level search category which specifies a narrower subject matter subcategory related to a linked first level search category, alphabet letters A through Z arranged adjacent said first level search categories, and a scroll bar adjacent said first level search categories for navigating through said first level search categories;
   (ii) pointing and clicking on a first level search categoly;
   (iii) receiving a display of a second interface comprising at least one second level search category corresponding to said first level search category, wherein each second level search category is configured for pointing and clicking to link to at least one third level search category;
   (iv) pointing and clicking on a second level search category;
   (v) receiving a display of a third interface comprising at least one third level search category corresponding to said second level search category, wherein each third level search category is a uniform research locator configured for pointing and clicking to link to an internet web site;
   (vi) pointing and clicking on a third level search category; and
   (vii) receiving a display of a web page of said internet web site corresponding to said third level search category, wherein the categories in each of the first, second and third levels are pre-selected and uploaded by a service provider of the internet virtual directory system, and the categories of at least the second level are pre-selected based on the user's expected search results relating to the selected first level search category and uploaded by the service provider.

15. The method of claim 14, further comprising: (i) pointing and clicking on an alphabet letter; (ii) receiving a display of a group of said first level search categories corresponding to said alphabet letter; and (iii) pointing and clicking on a first level search category from said group of said first level search categories.

16. The method of claim 14, further comprising pointing and clicking on said scroll bar to locate a first level search category.

17. The method of claim 14, wherein said second interface comprises said alphabet letters arranged adjacent said second level search categories.

18. The method of claim 14, wherein said first level search category is displayed in said second interface adjacent said second level search categories.

19. The method of claim 14, wherein said third interface comprises said alphabet letters arranged adjacent said third level search categories.

20. The method of claim 14, wherein a search path is displayed in said third interface adjacent said third level search categories.

21. The method of claim 14, wherein a return bar is displayed adjacent said web page of said internet web site.

22. The method of claim 21, wherein said return bar comprises a return button or icon.

23. The method of claim 22, further comprising pointing and clicking on said return button or icon to return to said internet virtual directory system.

24. The method of claim 21, wherein said return bar includes a hide button or icon for hiding said return bar.

25. The method of claim 24, further comprising pointing and clicking on said hide button or icon to hide said return bar.

26. The method of claim 14, further comprising using a mouse to point and click through said internet virtual directory system.

27. A method for guiding a user through at least three interface levels of an internet virtual directory system to a desired internet web site relating to a search, comprising:
   (i) receiving a display of a first interface comprising, a plurality of first level search categories arranged in alphabetical order in a single web page, wherein each of said first level search categories is configured for pointing and clicking to link to at least one second level search category which specifies a narrower subject matter subcategory related to a linked first level search category, and alphabet letters A through Z arranged adjacent said first level search categories;
   (ii) pointing and clicking on an alphabet letter;
   (iii) receiving a display of a group of first level search categories corresponding to said alphabet letter;
   (iv) pointing and clicking on a first level search category selected from said group of first level search categories;
   (v) receiving a display of a second interface comprising at least one second level search category corresponding to said first level search category, wherein each second level search category is configured for pointing and clicking to link to at least one third level search category;

(vi) pointing and clicking on a second level search category;

(vii) receiving a display of a third interface comprising at least one third level search category corresponding to said second level search category, wherein each third level search category is a uniform research locator configured for pointing and clicking to link to an internet web site;

(viii) pointing and clicking on a third level search category; and (ix) receiving a display of a web page of said internet web site corresponding to said third level search category, wherein the categories in each of the first, second and third levels are pre-selected and uploaded by a service provider of the internet virtual directory system, and the categories of at least the second level are pre-selected based on the user's expected search results relating to the selected first level search category and uploaded by the service provider.

28. The method of claim 27, wherein said second interface comprises said alphabet letters arranged adjacent said second level search categories.

29. The method of claim 27, wherein said first level search category is displayed in said second interface adjacent said second level search categories.

30. The method of claim 27, wherein said third interface comprises said alphabet letters arranged adjacent said third level search categories.

31. The method of claim 27, wherein a search path is displayed in said third interface adjacent said third level search categories.

32. The method of claim 27, wherein a return bar is displayed adjacent said web page of said internet web site.

33. The method of claim 32, wherein said return bar comprises a return button or icon.

34. The method of claim 33, further comprising pointing and clicking on said return button or icon to return to said internet virtual directory system.

35. The method of claim 32, wherein said return bar includes a hide button or icon for hiding said return bar.

36. The method of claim 35, further comprising pointing and clicking on said hide button or icon to hide said return bar.

37. The method of claim 27, further comprising using a mouse to point and click through said internet virtual directory system.

38. A method for guiding a user through at least three interface levels of an internet virtual directory system to a desired internet web site relating to a search, comprising:

(i) receiving a display of a first interface comprising, a plurality of first level search categories arranged in a single web page, wherein each of said first level search categories is configured for pointing and clicking to link to at least one second level search category which specifies a narrower subject matter subcategory related to a linked first level search category, and a scroll bar adjacent said first level search categories for navigating through said first level search categories;

(ii) pointing and clicking on said scroll bar to locate a first level search category;

(iii) pointing and clicking on said first level search category;

(iv) receiving a display of a second interface comprising at least one second level search category corresponding to said first level search category, wherein each second level search category is configured for pointing and clicking to link to at least one third level search category;

(v) pointing and clicking on a second level search category;

(vi) receiving a display of a third interface comprising at least one third level search category corresponding to said second level search category, wherein each third level search category is a uniform research locator configured for pointing and clicking to link to an internet web site;

(vii) pointing and clicking on a third level search category; and (viii) receiving a display of a web page of said internet web site corresponding to said third level search category, wherein the categories in each of the first, second and third levels are pre-selected and uploaded by a service provider of the internet virtual directory system, and the categories of at least the second level are pre-selected based on the user's expected search results relating to the selected first level search category and uploaded by the service provider.

39. The method of claim 38, wherein said first level search category is displayed in said second interface adjacent said second level search categories.

40. The method of claim 38, wherein a search path is displayed in said third interface adjacent said third level search categories.

41. The method of claim 38, wherein a return bar is displayed adjacent said web page of said internet web site.

42. The method of claim 41, wherein said return bar comprises a return button or icon.

43. The method of claim 42, further comprising pointing and clicking on said return button or icon to return to said internet virtual directory system.

44. The method of claim 41, wherein said return bar includes a hide button or icon for hiding said return bar.

45. The method of claim 44, further comprising pointing and clicking on said hide button or icon to hide said return bar.

46. The method of claim 38, further comprising using a mouse to point and click through said internet virtual directory system.

47. A method for pointing and clicking guiding a user through at least three interface levels of an internet virtual directory system to a desired internet web site relating to a search, comprising:

(i) receiving a display of a first interface comprising a plurality of first level search categories, wherein each of said first level search categories is configured for pointing and clicking to link to at least one second level search category which specifies a narrower subject matter subcategory related to a linked first level search category;

(ii) pointing and clicking on a first level search categoly;

(iii) receiving a display of a second interface comprising at least one second level search category corresponding to said first level search category, wherein each second level search category is configured for pointing and clicking to link to at least one third level search categoly;

(iv) pointing and clicking on a second level search category;

(v) receiving a display of a third interface comprising at least one third level search category corresponding to said second level search category, wherein each third level search category is a uniform research locator configured for pointing and clicking to link to an internet web site;

(vi) pointing and clicking on a third level search category; and (vii) receiving a display of a web page of said internet web site corresponding to said third level search category, wherein the categories in each of the first, second and third levels are pre-selected and uploaded by a service provider of the internet virtual directory system, and the categories of at least the second level are pre-selected based on the user's expected search results relating to the selected first level search category and uploaded by the service provider.

48. The method of claim 47, wherein said first level search category is displayed in said second interface adjacent said second level search categories.

49. The method of claim 47, wherein a search path is displayed in said third interface adjacent said third level search categories.

50. The method of claim 47, wherein a return bar is displayed adjacent said web page of said internet web site.

51. The method of claim 50, wherein said return bar comprises a return button or icon.

52. The method of claim 51, further comprising pointing and clicking on said return button or icon to return to said internet virtual directory system.

53. The method of claim 50, wherein said return bar includes a hide button or icon for hiding said return bar.

54. The method of claim 53, further comprising pointing and clicking on said hide button or icon to hide said return bar.

55. The method of claim 47, further comprising using a mouse to point and click through said internet virtual directory system.

56. A method for guiding a user through at least three interface levels of an internet virtual directory system to a desired internet web site relating to a search, comprising:

(i) transmitting a display of a first interface comprising, at least 1,000 first level search categories arranged in alphabetical order in a single web page, wherein each of said first level search categories is configured for pointing and clicking to link to no more than 30 second level search categories each which specifies a narrower subject matter subcategory related to a linked first level search category, alphabet letters A through Z arranged adjacent said first level search categories, and a scroll bar adjacent said first level search categories for navigating through said first level search categories;

(ii) receiving a click command to select a first level search category;

(iii) transmitting a display of a second interface comprising a plurality of said second level search categories corresponding to said first level search category, wherein each of said second level search categories is configured for pointing and clicking to link to no more than 30 third level search categories;

(iv) receiving a click command to select a second level search category;

(v) transmitting a display of a third interface comprising a plurality of said third level search categories corresponding to said second level search category, wherein each of said third level search categories is a uniform research locator configured for pointing and clicking to link to an internet web site;

(vi) receiving a click command to select a third level search category; and (vii) transmitting a display of a web page of said internet web site corresponding to said third level search category, wherein the categories in each of the first, second and third levels are pre-selected and uploaded by a service provider of the internet virtual directory system, and the categories of at least the second level are pre-selected based on the user's expected search results relating to the selected first level search category and uploaded by the service provider.

57. The method of claim 56, further comprising: (i) receiving a click command to select an alphabet letter; (ii) transmitting a display of a group of said first level search categories corresponding to said alphabet letter; and (iii) receiving a click command to select a first level search category from said group of said first level search categories.

58. The method of claim 56, further comprising receiving a click command to control said scroll bar to locate a first level search category.

59. The method of claim 56, wherein said second interface comprises said alphabet letters arranged adjacent said second level search categories.

60. The method of claim 56, wherein said first level search category is displayed in said second interface adjacent said second level search categories.

61. The method of claim 56, wherein said third interface comprises said alphabet letters arranged adjacent said third level search categories.

62. The method of claim 56, wherein a search path is displayed in said third interface adjacent said third level search categories.

63. The method of claim 56, wherein a return bar is displayed adjacent said web page of said internet web site.

64. The method of claim 63, wherein said return bar comprises a return button or icon.

65. The method of claim 64, further comprising: (i) receiving a click command from said return button or icon to return to said internet virtual directory system; and (ii) transmitting a display of said third interface.

66. The method of claim 63, wherein said return bar includes a hide button or icon for hiding said return bar.

67. The method of claim 66, further comprising: (i) receiving a click command from said hide button or icon to hide said return bar; and (ii) transmitting a display of said web page without said return bar.

68. The method of claim 56, further comprising receiving said click commands from a mouse.

69. A method for guiding a user through at least three interface levels of an internet virtual directory system to a desired internet web site relating to a search, comprising:

(i) transmitting a display of a first interface comprising, a plurality of first level search categories arranged in alphabetical order in a single web page, wherein each of said first level search categories is configured for pointing and clicking to link to at least one second level search category which specifies a narrower subject matter subcategory related to a linked first level search category, alphabet letters A through Z arranged adjacent said first level search categories, and a scroll bar adjacent said first level search categories for navigating through said first level search categories;

(ii) receiving a click command to select a first level search category;

(iii) transmitting a display of a second interface comprising at least one second level search category corresponding to said first level search category, wherein each second level search category is configured for pointing and clicking to link to at least one third level search category;
- (iv) receiving a click command to select a second level search category;
- (v) transmitting a display of a third interface comprising at least one third level search category corresponding to said second level search category, wherein each third level search category is a uniform research locator configured for pointing and clicking to link to an internet web site;
- (vi) receiving a click command to select a third level search category; and
- (vii) transmitting a display of a web page of said internet web site corresponding to said third level search category,
- wherein the categories in each of the first, second and third levels are pre-selected and uploaded by a service provider of the internet virtual directory system, and the categories of at least the second level are pre-selected based on the user's expected search results relating to the selected first level search category and uploaded by the service provider.

70. The method of claim 69, further comprising: (i) receiving a click command to select an alphabet letter; (ii) transmitting a display of a group of said first level search categories corresponding to said alphabet letter; and (iii) receiving a click command to select a first level search category from said group of said first level search categories.

71. The method of claim 69, further comprising receiving a click command to control said scroll bar to locate a first level search category.

72. The method of claim 69, wherein said second interface comprises said alphabet letters arranged adjacent said second level search categories.

73. The method of claim 69, wherein said first level search category is displayed in said second interface adjacent said second level search categories.

74. The method of claim 69, wherein said third interface comprises said alphabet letters arranged adjacent said third level search categories.

75. The method of claim 69, wherein a search path is displayed in said third interface adjacent said third level search categories.

76. The method of claim 69, wherein a return bar is displayed adjacent said web page of said internet web site.

77. The method of claim 76, wherein said return bar comprises a return button or icon.

78. The method of claim 77, further comprising: (i) receiving a click command from said return button or icon to return to said internet virtual directory system; and (ii) transmitting a display of said third interface.

79. The method of claim 76, wherein said return bar includes a hide button or icon for hiding said return bar.

80. The method of claim 79, further comprising: (i) receiving a click command from said hide button or icon to hide said return bar; and (ii) transmitting a display of said web page without said return bar.

81. The method of claim 69, further comprising receiving said click commands from a mouse.

82. A method for guiding a user through at least three interface levels of an internet virtual directory system to a desired internet web site relating to a search, comprising:
- (i) transmitting a display of a first interface comprising, a plurality of first level search categories arranged in alphabetical order in a single web page, wherein each of said first level search categories is configured for pointing and clicking to link to at least one second level search category which specifies a narrower subject matter subcategory related to a linked first level search category, and alphabet letters A through Z arranged adjacent said first level search categories;
- (ii) receiving a click command to select an alphabet letter;
- (iii) transmitting a display of a group of first level search categories corresponding to said alphabet letter;
- (iv) receiving a click command to select a first Level search category selected from said group of first level search categories;
- (v) transmitting a display of a second interface comprising at least one second level search category corresponding to said first level search category, wherein each second level search category is configured for pointing and clicking to link to at least one third level search category;
- (vi) receiving a click command to select a second level search category;
- (vii) transmitting a display of a third interface comprising at least one third level search category corresponding to said second level search category, wherein each third level search category is a uniform research locator configured for pointing and clicking to link to an internet web site;
- (viii) receiving a click command to select a third level search category; and
- (ix) transmitting a display of a web page of said internet web site corresponding to said third level search category,
- wherein the categories in each of the first, second and third levels are pre-selected and uploaded by a service provider of the internet virtual directory system, and the categories of at least the second level are pre-selected based on the user's expected search results relating to the selected first level search category and uploaded by the service provider.

83. The method of claim 82, wherein said second interface comprises said alphabet letters arranged adjacent said second level search categories.

84. The method of claim 82, wherein said first level search category is displayed in said second interface adjacent said second level search categories.

85. The method of claim 82, wherein said third interface comprises said alphabet letters arranged adjacent said third level search categories.

86. The method of claim 82, wherein a search path is displayed in said third interface adjacent said third level search categories.

87. The method of claim 82, wherein a return bar is displayed adjacent said web page of said internet web site.

88. The method of claim 87, wherein said return bar comprises a return button or icon.

89. The method of claim 88, further comprising: (i) receiving a click command from said return button or icon to return to said internet virtual directory system; and (ii) transmitting a display of said third interface.

90. The method of claim 87, wherein said return bar includes a hide button or icon for hiding said return bar.

91. The method of claim 90, further comprising: (i) receiving a click command from said hide button or icon to hide said return bar; and (ii) transmitting a display of said web page without said return bar.

92. The method of claim 82, further comprising receiving said click commands from a mouse.

93. A method for guiding a user through at least three interface levels of an internet virtual directory system to a desired internet web site relating to a search, comprising:
 (i) transmitting a display of a first interface comprising, a plurality of first level search categories arranged in a single web page, wherein each of said first level search categories is configured for pointing and clicking to link to at least one second level search category which specifies a narrower subject matter subcategory related to a linked first level search category, and a scroll bar adjacent said first level search categories for navigating through said first level search categories;
 (ii) receiving a click command to control said scroll bar to locate a first level search category;
 (iii) receiving a click command to select said first level search category;
 (iv) transmitting a display of a second interface comprising at least one second level search category corresponding to said first level search category, wherein each second level search category is configured for pointing and clicking to link to at least one third level search category;
 (v) receiving a click command to select a second level search category;
 (vi) transmitting a display of a third interface comprising at least one third level search category corresponding to said second level search category, wherein each third level search category is a uniform research locator configured for pointing and clicking to link to an internet web site;
 (vii) receiving a click command to select a third level search category; and
 (viii) transmitting a display of a web page of said internet web site corresponding to said third level search category,
 wherein the categories in each of the first, second and third levels are pre-selected and uploaded by a service provider of the internet virtual directory system, and the categories of at least the second level are pre-selected based on the user's expected search results relating to the selected first level search category and uploaded by the service provider.

94. The method of claim 93, wherein said first level search category is displayed in said second interface adjacent said second level search categories.

95. The method of claim 93, wherein a search path is displayed in said third interface adjacent said third level search categories.

96. The method of claim 93, wherein a return bar is displayed adjacent said web page of said internet web site.

97. The method of claim 96, wherein said return bar comprises a return button or icon.

98. The method of claim 97, further comprising: (i) receiving a click command from said return button or icon to return to said internet virtual directory system; and (ii) transmitting a display of said third interface.

99. The method of claim 96, wherein said return bar includes a hide button or icon for hiding said return bar.

100. The method of claim 99, further comprising: (i) receiving a click command from said hide button or icon to hide said return bar; and (ii) transmitting a display of said web page without said return bar.

101. The method of claim 93, further comprising receiving said click commands from a mouse.

102. A method for guiding a user through at least three interface levels of an internet virtual directory system to a desired internet web site relating to a search, comprising:
 (i) transmitting a display of a first interface comprising a plurality of first level search categories, wherein each of said first level search categories is configured for pointing and clicking to link to at least one second level search category which specifies a narrower subject matter subcategory related to a linked first level search category;
 (ii) receiving a click command to select a first level search category;
 (iii) transmitting a display of a second interface comprising at least one second level search category corresponding to said first level search category, wherein each second level search category is configured for pointing and clicking to link to at least one third level search category;
 (iv) receiving a click command to select a second level search category;
 (v) transmitting a display of a third interface comprising at least one third level search category corresponding to said second level search category, wherein each third level search category is a uniform research locator configured for pointing and clicking to link to an internet web site;
 (vi) receiving a click command to select a third level search category; and
 (vii) transmitting a display of a web page of said internet web site corresponding to said third level search category,
 wherein the categories in each of the first, second and third levels are pre-selected and uploaded by a service provider of the internet virtual directory system, and the categories of at least the second level are pre-selected based on the user's expected search results relating to the selected first level search category and uploaded by the service provider.

103. The method of claim 102, wherein said first level search category is displayed in said second interface adjacent said second level search categories.

104. The method of claim 102, wherein a search path is displayed in said third interface adjacent said third level search categories.

105. The method of claim 102, wherein a return bar is displayed adjacent said web page of said internet web site.

106. The method of claim 105, wherein said return bar comprises a return button or icon.

107. The method of claim 106, further comprising: (i) receiving a click command from said return button or icon to return to said internet virtual directory system; and (ii) transmitting a display of said third interface.

108. The method of claim 105, wherein said return bar includes a hide button or icon for hiding said return bar.

109. The method of claim 108, further comprising: (i) receiving a click command from said hide button or icon to hide said return bar; and (ii) transmitting a display of said web page without said return bar.

110. The method of claim 102, further comprising receiving said click commands from a mouse.

111. A method for guiding a user through at least three interface levels of an internet virtual directory system to a desired internet web site relating to a search, comprising: (i) transmitting a first display of at least one interface comprising a plurality of first search categories; (ii) receiving a click command to select a first search category; (iii) transmitting a second display of at least one interface comprising a plurality of second search categories each specifying a narrower subject matter subcategory related to the selected first search category; (iv) receiving a click command to select a second search category; and (v) transmitting a display of a web page of an internet web site corresponding to the second search category, wherein each of the first and second search categories are pre-selected and uploaded by a service provider of the internet virtual directory system, and the categories of at least the second level are pre-selected based on the user's expected search results relating to the selected first level search category and uploaded by the service provider.

112. The method of claim 111, wherein said interface further comprises alphabet letters A through Z arranged adjacent said search categories.

113. The method of claim 112, further comprising: (i) receiving a click command to select an alphabet letter; (ii) transmitting a display of a group of search categories corresponding to said alphabet letter; and (iii) receiving a click command to select a search category from said group of search categories.

114. The method of claim 111, wherein said interface further comprises a scroll bar adjacent said search categories for navigating through said search categories.

115. The method of claim 114, further comprising receiving a click command to control said scroll bar to locate a search category.

116. The method of claim 111, wherein a return bar is displayed adjacent said web page of said internet web site.

117. The method of claim 116, wherein said return bar comprises a return button or icon.

118. The method of claim 117, further comprising: (i) receiving a click command from said return button or icon to return to said internet virtual directory system; and (ii) transmitting a display of said interface.

119. The method of claim 116, wherein said return bar includes a hide button or icon for hiding said return bar.

120. The method of claim 119, further comprising: (i) receiving a click command from said hide button or icon to hide said return bar; and (ii) transmitting a display of said web page without said return bar.

121. The method of claim 111, further comprising receiving said click command from a mouse.

122. A method for guiding a user through at least three interface levels of an internet virtual directory system to a desired internet web site relating to a search, comprising: (i) transmitting a display of a first interface and a second interface, wherein each of the first and second interfaces comprises a plurality of search categories and is linked to each other in such a way that a first search category is linked to at least a second search category that specifies a narrower subject matter subcategory related to the first search category; (ii) receiving a click command to select the first search category for each of the first and second interfaces; and (iii) transmitting a display of a web page of an internet web site corresponding to a selected second search category, wherein the search categories for each of the first and second interfaces are preselected and uploaded by a service provider of said internet virtual directory system, and the categories of at least the second level are pre-selected based on the user's expected search results relating to the selected first level search category and uploaded by the service provider.

123. The method of claim 122, wherein each of the first and second interfaces further comprises alphabet letters A through Z arranged adjacent the search categories of each of the first and second interfaces.

124. The method of claim 123, further comprising: (i) receiving a click command to select an alphabet letter; (ii) transmitting a display of a group of search categories corresponding to said alphabet letter; and (iii) receiving a click command to select a search category from said group of search categories.

125. The method of claim 122, wherein each of the first and second interfaces further comprises a scroll bar adjacent said search categories for navigating through said search categories.

126. The method of claim 125, further comprising receiving a click command to control said scroll bar to locate a search category.

127. The method of claim 122, wherein a return bar is displayed adjacent said web page of said internet web site.

128. The method of claim 127, wherein said return bar comprises a return button or icon.

129. The method of claim 128, further comprising: (i) receiving a click command from said return button or icon to return to said internet virtual directory system; and (ii) transmitting a display of said interface.

130. The method of claim 127, wherein said return bar includes a hide button or icon for hiding said return bar.

131. The method of claim 130, further comprising: (i) receiving a click command from said hide button or icon to hide said return bar; and (ii) transmitting a display of said web page without said return bar.

132. The method of claim 122, further comprising receiving said click command from a mouse.

\* \* \* \* \*

UNITED STATES PATENT AND TRADEMARK OFFICE
CERTIFICATE OF CORRECTION

| | | |
|---|---|---|
| PATENT NO. | : 7,149,743 B2 | Page 1 of 1 |
| APPLICATION NO. | : 09/781901 | |
| DATED | : December 12, 2006 | |
| INVENTOR(S) | : Ronald W. Colwill, Jr. | |

It is certified that error appears in the above-identified patent and that said Letters Patent is hereby corrected as shown below:

In claim 14 (col. 13, line 48), please replace "categoly" with --category--.

In claim 47 (col. 16, line 45), please replace "method for pointing and clicking guiding" with --method for guiding--.

In claim 47 (col. 16, line 56), please replace "categoly" with --category--.

In claim 47 (col. 16, line 62), please replace "categoly" with --category--.

In claim 82 (col. 20, line 9), please replace "Level" with --level--.

Signed and Sealed this

Thirteenth Day of February, 2007

JON W. DUDAS
*Director of the United States Patent and Trademark Office*